United States Patent [19]
Mott

[11] Patent Number: 5,993,345
[45] Date of Patent: Nov. 30, 1999

[54] COMPRESSION FIXED RATIO CHAIN

[75] Inventor: Philip J. Mott, Dryden, N.Y.

[73] Assignee: Borg-Warner Automotive, Inc., Troy, Mich.

[21] Appl. No.: 08/958,027

[22] Filed: Oct. 27, 1997

[51] Int. Cl.[6] .................................................. F16G 1/28
[52] U.S. Cl. ........................ 474/202; 474/201; 474/205; 474/242
[58] Field of Search ..................... 474/170, 171, 474/172, 112, 174, 201, 202, 205, 240, 241, 242, 244, 245

[56] References Cited

U.S. PATENT DOCUMENTS

| | | | |
|---|---|---|---|
| 499,961 | 6/1893 | Brown ................................. | 474/212 X |
| 1,601,663 | 9/1926 | Abbott ................................. | 474/201 |
| 4,299,586 | 11/1981 | Van der Hardt Aberson ......... | 474/201 |
| 4,464,152 | 8/1984 | Kern .................................... | 474/245 |
| 4,498,892 | 2/1985 | Huntley .............................. | 474/242 |
| 4,619,634 | 10/1986 | Nakawaki .......................... | 474/201 |
| 4,655,735 | 4/1987 | Sakakibara et al. ................. | 474/245 |
| 4,894,049 | 1/1990 | Koppelaars ........................ | 474/240 |
| 4,943,266 | 7/1990 | Mott .................................. | 474/201 |
| 5,147,251 | 9/1992 | Cole .................................. | 474/206 |
| 5,154,675 | 10/1992 | Roovers ............................ | 474/242 |
| 5,180,345 | 1/1993 | Van Der Zande ................. | 474/201 |
| 5,437,581 | 8/1995 | Ledvina et al. ................... | 474/85 |

FOREIGN PATENT DOCUMENTS

| | | | |
|---|---|---|---|
| 256918 | 3/1949 | Germany ........................... | 474/201 |
| 405172188 | 7/1993 | Japan ................................. | 474/201 |

*Primary Examiner*—Tamara L. Graysay
*Assistant Examiner*—Marcus Charles
*Attorney, Agent, or Firm*—Sidley & Austin; Greg Dziegielewski

[57] ABSTRACT

A power transmission system for transmitting power between a plurality of toothed sprockets mounted on rotating members. The system includes a chain comprising a plurality of transverse elements arranged in an endless loop and maintained in a stack by a plurality of endless carriers received in slots in each transverse element. Power is transmitted along the chain by contact between the principal faces of the transverse elements. The transverse elements include a plurality of load bearing elements which are configured to engage the teeth of the sprockets and provide power transmission therewith.

20 Claims, 3 Drawing Sheets

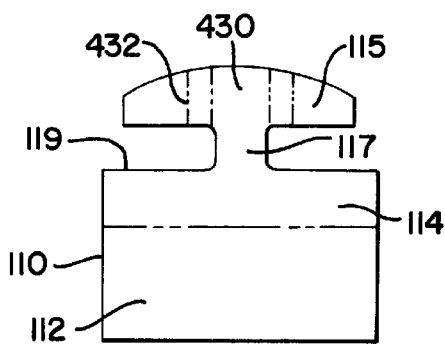
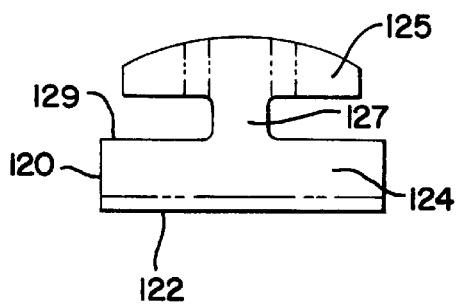
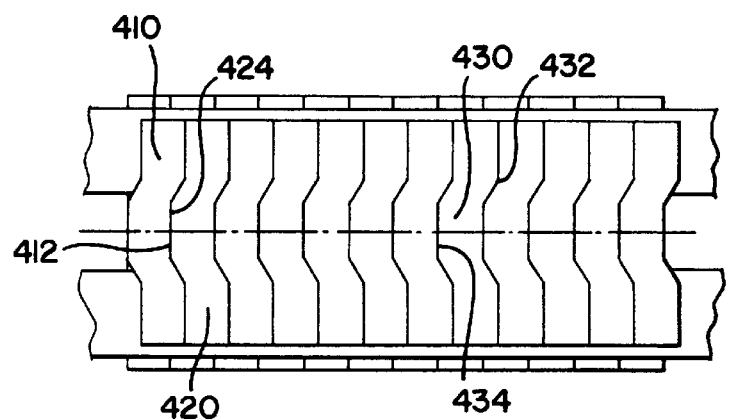
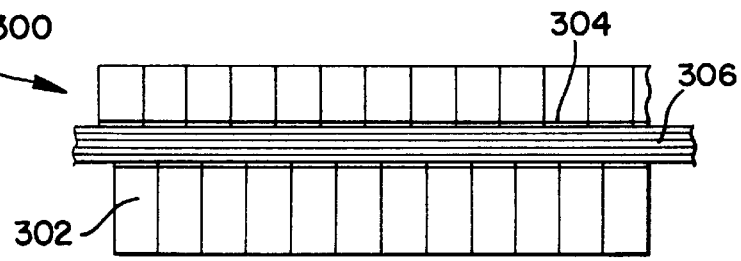
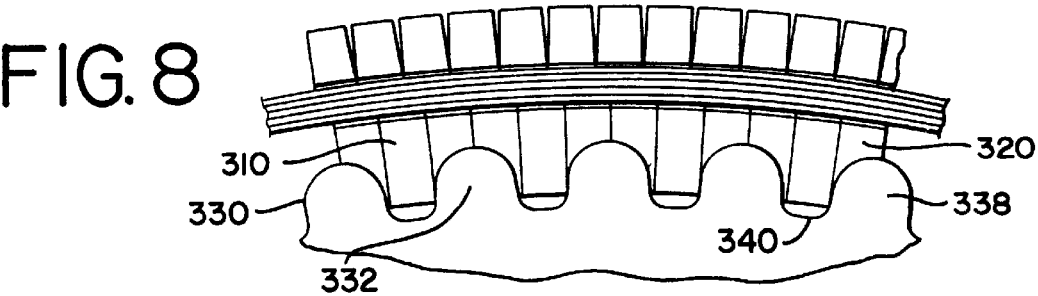

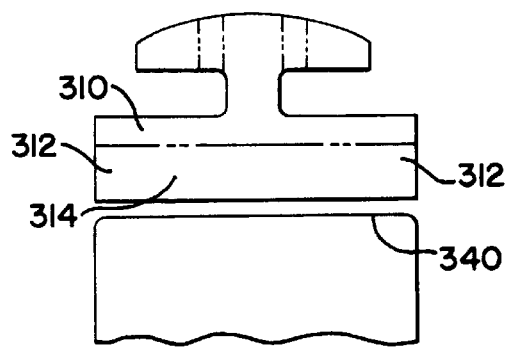
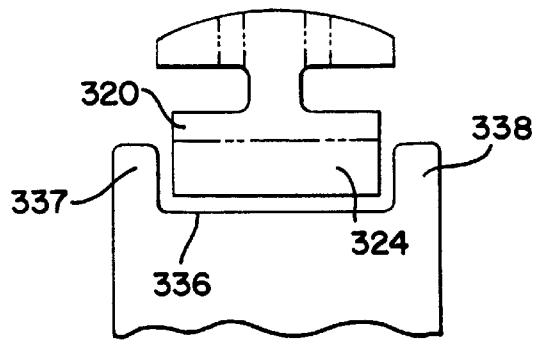
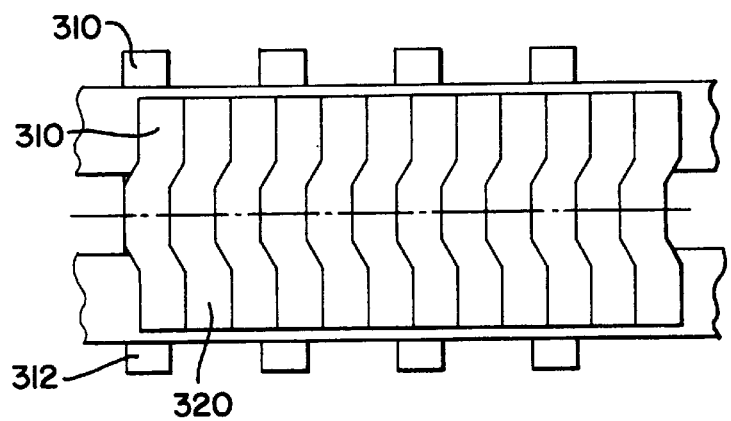
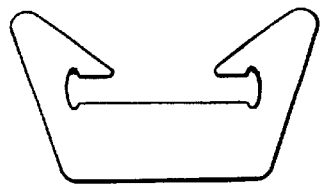
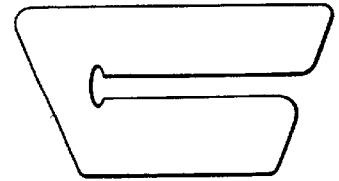

COMPRESSION FIXED RATIO CHAIN

BACKGROUND OF THE INVENTION

The present invention relates generally to a system of transmitting power from a rotating shaft to at least one other rotating shaft, and to a chain for transmitting power between the shafts. The present invention is particularly directed to a system where sprockets of fixed diameter are mounted on the shafts, and the chain engages the teeth of the sprockets. However, the chain of the present invention may be used with various types of power transmission systems employing rotating shafts.

Power transmission chains are widely used in the automotive industry in automobile transmission systems as well as in engine timing drives. Engine timing systems conventionally include at least one driving sprocket located on the crankshaft and at least one driven sprocket located on a camshaft. Rotation of the crankshaft causes rotation of the camshaft through a chain. In automotive transmission systems, power transmission chains are used, for example, between a torque converter and the input to an automatic transmission. Power transmission chains are also used in transfer cases for four-wheel drive vehicles.

A number of different methods are employed to provide power transmission between rotating shafts. One such method involves a continuously variable transmission system (CVT). In contrast to a transmission system employing sprockets or gears which provide a discrete number of fixed transmission ratios, a CVT system provides any transmission ratio within an allowable range. In general, an endless belt provides power transmission between a drive shaft pulley and at least one driven shaft pulley. Each pulley comprises a pair of conical disks, or sheaves, with converging ends facing each other, so that a groove is formed between the conical disks, and the belt is positioned within the groove. In at least one pulley, one conical disk is axially moveable with respect to the other. Because the diameter of the conical disk varies along the axis of the disk, axial movement of the moveable disk changes the running diameter of the belt around the pulley. This change in the running diameter results in a change of the transmission ratio.

Typically, CVT belts comprise a number of endless metal bands, such as laminated metal strips formed in a loop. A plurality of transverse elements are positioned along the bands, with the bands received in slots in the transverse elements. The transverse elements are typically stamped metal plates arranged front to back around the loop of the endless carriers. The transverse elements typically have a generally trapezoidal shape, with at least two surfaces adapted to contact the sides of the pulleys, thereby providing power transmission between the belt and the pulleys. U.S. Pat. No. 4,894,049, which is incorporated herein by reference, discloses a typical CVT belt known in the art.

Another type of power transmission system employs a chain with links having inverted teeth, sometimes referred to as a silent chain, and at least one toothed sprocket on each rotating shaft. Power transmission between each sprocket and the chain, and consequently between one sprocket and another sprocket, is provided by the meshing of the sprocket teeth with the inverted teeth of the chain.

Inverted tooth chains are formed by an arrangement of link plates in lateral and longitudinal directions. The links are interlaced and joined by pins. A typical chain is composed of inner links, which contact the teeth of a sprocket to provide power transmission, and guide links, which do not provide power transmission. Guide links are employed to maintain the chain on the center of the sprocket when the chain is wound around the sprocket. A row of link plates, arranged in the lateral direction, typically has a number of inner links combined with guide links in the center or at both edges of the row. Each inner link plate typically comprises a body portion having a pair of apertures for receiving the pins, and at least one depending toe shaped to fit between the teeth of the sprocket and provide power transmission therewith. U.S. Pat. No. 5,347,581, which is incorporated herein by reference, shows an inverted tooth chain known in the art.

Inverted tooth chains and CVT belts each have certain disadvantages with respect to strength and durability. CVT belts typically have limited capacity when wrapped around pulleys of small diameter, because of the acute bending required of the metal bands. Inverted tooth chains, which articulate by the rotation of link plates about the pins, do not have this problem when employed with sprockets of small diameter. However, inverted tooth chains are susceptible to damage resulting from a large torque applied to one of the rotating shafts. Excessive torque applied to an inverted tooth chain may cause bending of the pins or failure of the link plates in the area around the pin apertures.

In contrast, excessive torque applied to a CVT belt is transmitted along the length of the belt by compression of the transverse elements against each other. Failure resulting from such torque only occurs if the torque is sufficient to cause deformation of the transverse elements or tensile failure from the bending of the CVT belt. Accordingly, CVT belts are generally less susceptible to failure from excessive torque when operated over a large diameter rotating member.

Accordingly, it is an object of the present invention to provide a power transmission system capable of withstanding high torques applied to the rotating members. It is another object of the present invention to provide a power transmission system having advantages of both CVT belts and silent chains. It is a further object of the present invention to provide a power transmission system having a chain of which absorbs torque by compression of its members which is suitable for use in a fixed ratio power transmission system. It is still another object of this invention to provide a power transmission system having a chain which absorbs torque by compression of its members which is adapted to operate with a toothed sprocket and to provide power transmission therewith. Other objects of the invention will be apparent to one skilled in the art.

SUMMARY OF THE INVENTION

The present invention relates to power transmission systems and, in particular, to a system of transmitting power between a driving rotating shaft and a plurality of driven rotating shafts. Rotating members each having a fixed diameter, such as toothed sprockets, are provided on each shaft. The present invention is further directed to a power transmission chain comprised of a plurality of transverse members arranged longitudinally in an endless loop. The members are configured so that some of the members engage the teeth of the sprockets, and power is transmitted along the length of the chain by compression of the transverse members.

For purposes of this application, the longitudinal direction is the direction of chain travel. The lateral or transverse direction is the direction parallel to the axis of a shaft as the chain traverses a sprocket mounted on the shaft. The radial or vertical direction is the direction orthogonal to both the lateral and longitudinal directions; when the chain is engaging a sprocket, it is the direction of a radius of the sprocket. The bottom or radial inside of the chain is the portion of the chain closer to the center of a sprocket as the chain circles the sprocket; the top of the chain is the portion of the chain radially opposite the bottom of the chain. The principal faces of a transverse element are the faces of the transverse elements oriented roughly orthogonal to the longitudinal direction. The profile of a transverse element is the shape of a principal face of the transverse element.

In one embodiment of the present invention, the power transmission chain has a configuration similar to the configuration of a CVT belt. A series of transverse elements are arranged front to back in an endless loop. A plurality of metal carrier bands are received in slots in the transverse elements. A plurality of load bearing transverse elements are interspersed with the other transverse elements. These load bearing elements are configured to interlock with or otherwise contact the teeth of the sprockets. Thus, power is transmitted from a sprocket to the load bearing elements or vice versa. Within the chain, power is transmitted along the length of the chain by contact between the principal faces of the transverse elements. Thus, failure due to excessive loading can only occur through deformation or bending of the transverse elements.

In another embodiment of the present invention, the load bearing elements each have a toe portion which extends below the bottom of the non-load bearing elements when the chain engages a sprocket. During operation, the non-load bearing elements pass above the sprocket teeth, while the toe portion of the load bearing elements extend into the root of the sprocket teeth. Thus, the load bearing elements provide power transmission with the sprocket teeth. In other embodiments of this general type of chain, the load bearing elements may be arranged in groups, such as two load bearing elements followed by two non-load bearing elements, or three load bearing elements followed by three non-load bearing elements.

In another embodiment of the present invention, each load bearing element has at least one flange on its lateral outside surface. The sprocket teeth have a laterally central groove which is wide enough to permit the non-load bearing elements to pass without contacting the sprocket teeth. However, the flanges of the load bearing elements extend beyond the width of the sprocket tooth recess, so that contact occurs between the sprocket teeth and the flanges of the load bearing elements. This contact causes power transmission between the sprocket and the chain.

For a better understanding of these and other aspects and objects of the invention, reference should be made to the following detailed description taken in conjunction with the accompanying drawings.

BRIEF DESCRIPTION OF THE DRAWINGS

In the drawings, which are not to scale,

FIG. 4 is a front view of a load bearing element of the chain shown in FIG. 2;

FIG. 5 is a front view of a non-load bearing element of the chain shown in FIG. 2;

FIG. 6 is a top view of the chain shown in FIG. 2;

FIG. 7 is a side view of the chain of another embodiment of the present invention;

FIG. 8 is a side view of the chain shown in FIG. 7, engaging a sprocket;

FIG. 9 is a front view of a load bearing link plate of the chain shown in FIG. 7, adjacent to the root of a sprocket;

FIG. 10 is a front view of a non-load bearing link plate of the chain shown in FIG. 7, adjacent to a sprocket tooth;

FIG. 11 is a top view of the chain shown in FIG. 7;

FIG. 12 is a front view of a transverse element of another embodiment of the present invention;

FIG. 13 is a front view of a transverse element of another embodiment of the present invention.

DETAILED DESCRIPTION OF THE PREFERRED EMBODIMENTS

The present invention is directed to a fixed ratio power transmission system employing a compression chain. The chain is constructed such that power is transmitted along the chain by compression of transverse elements stacked in an endless loop, and the chain is configured to provide power transmission with the teeth of a fixed ratio sprocket system.

Figure 1:
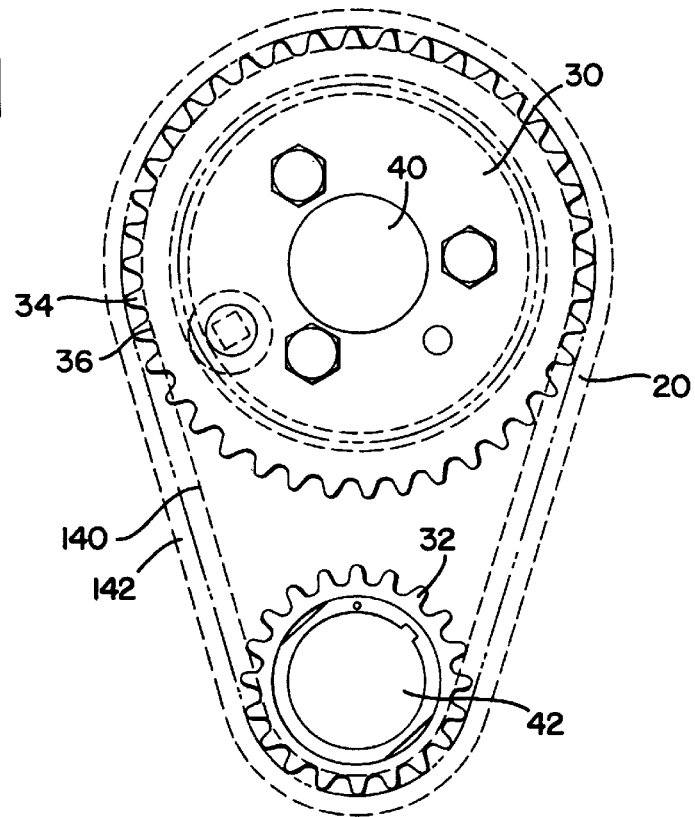
FIG. 1 is a side view of one embodiment of the present invention, a power transmission chain operating between a pair of sprockets.

Turning now to the drawings, FIG. 1 illustrates one embodiment of the present invention, an endless chain 20 wrapped around a plurality sprockets 30, 32 which are each mounted on a rotating shaft 40, 42. The sprockets have a plurality of teeth 34 uniformly spaced around the sprockets' outer circumference 36. These sprocket teeth engage the chain 20, as described below. Rotation of a driving sprocket 32 causes movement of the chain 20, which then causes rotation of a plurality of driven sprockets 30. Although the system shown in FIG. 1 employs a sprocket mounted on each shaft, the chain of the present invention could also be used in other configurations, including at least one shaft having a variable ratio pulley, within the scope of the present invention.

FIGS. 2–6 show one embodiment of the present invention. The chain 100 is constructed of a series of transverse elements. A carrier 102 is received in a recess 104 in each of the transverse elements. Typically, the carrier comprises a plurality of endless metal bands 106, although any carrier design well known in the art may be employed.

The transverse elements include a plurality of load bearing elements 110 as well as a plurality of non-load bearing elements 120. FIG. 4 shows a front view of a load bearing element of the chain shown in FIGS. 2 and 3. FIG. 5 shows a front view of a non-load bearing element of the chain shown in FIGS. 2 and 3. In the embodiment shown in FIGS. 4 and 5, the transverse elements have the head-pillars-body configuration. Specifically, each element 110, 120 has a top head portion 115, 125, and a lower body portion 114, 124, which are connected by a pillar portion 117, 127. The head, pillar, and body form a pair of bilateral recesses 119, 129 into which the carriers 106 are received.

Figure 2:
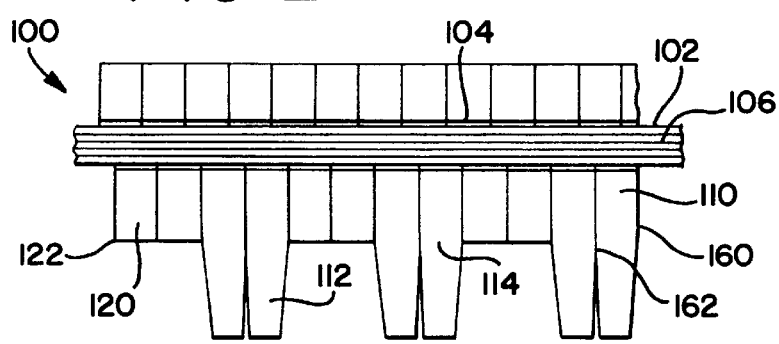
FIG. 2 is a side view of the chain of one embodiment of the present invention.
Figure 3:
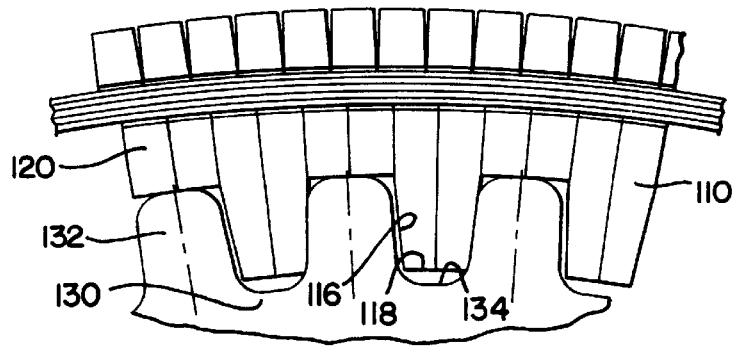
FIG. 3 is a side view of the chain shown in FIG. 2, engaging a sprocket.

The load bearing elements 110 each have a toe 112 which extends radially below the bottom 122 of the non-load bearing elements 120. During operation, power is transmitted between the sprockets and the load bearing elements. As shown in FIGS. 2 and 3, the toe 112 of the load-bearing elements 110 engages the teeth 132 of a sprocket 130 to provide power transmission therewith. In contrast, the bottom 122 of the non-load bearing elements 120 pass to the radial outside of the sprocket teeth 132, and do not contact the sprocket teeth. Power is transmitted along the chain 100 by the contact between the principal faces 160, 162 of the transverse elements.

In addition, the toe of each load bearing element has at least one surface which contacts the sprocket tooth. In the embodiment shown in FIG. 3, the toe 112 of each load bearing element 110 has at least two surfaces 116, 118 which may contact the sprocket tooth 132. Although these surfaces are shown as flat in FIG. 3, various other shapes may be employed within the scope of the invention. Also, different load bearing elements within the chain may have differing contact surface shapes. For instance, curved surfaces may be employed to achieve desired wear characteristics or noise characteristics during operation of the power transmission system.

FIGS. 7–12 show another embodiment of the present invention. As can be seen in FIGS. 7 and 8, this embodiment employs a chain 300 constructed of a series of transverse elements 302 having carriers 306 received in lateral slots 304. The transverse elements include load bearing elements 310 interspersed with non-load bearing elements 320. FIGS. 9 and 10 show front views of a load bearing element and a non-load bearing element, respectively. Each of the transverse elements 310, 320 have a head-pillars-body configuration. However, the body portion 314 of the load-bearing elements 310 includes a pair of flanges 312 on the lateral outsides of the element. Due to these flanges 312, the body 314 of the load-bearing elements have a greater width than the body 324 of the non-load bearing elements 320.

In the embodiment shown in FIGS. 7–12, the power transmission system includes sprockets 330 having teeth 332 adapted to facilitate power transmission with a compression chain. As shown in FIG. 10, the teeth include a pair of flanges 337, 338 forming a central groove 336. The width of this groove 336 is greater than the width of the body 324 of the non-load bearing element 320. However, the width of the sprocket tooth groove 336 is less than the width of the body 314 of the load bearing element 310. As the chain 320 traverses the sprocket 330, the body 324 of the non-load bearing elements 320 passes over the sprocket tooth root 340 and through the groove 336 of the sprocket teeth 330. However, the flanges 312 of the load bearing element 310 pass over the sprocket tooth root, but the flanges 312 contact the flanges 337, 338 of the sprocket tooth. This contact provides for power transmission between the load bearing elements and the sprocket teeth. The force applied by or to the sprocket teeth is transmitted along the chain by the contact between the principal faces of the transverse elements. The advantages of this design include the ability to operate under high torque, because radially shorter sprocket teeth may be strengthened by providing laterally wider sprockets.

In the embodiment of the present invention shown in FIG. 3, the transverse elements are arranged sequentially as a series of pairs of load bearing elements 110 each followed by a pair of non-load bearing elements 120. In the embodiment of the present invention shown in FIG. 8, the transverse elements are arranged sequentially as a series of single load bearing elements 310 each followed by a pair of non-load bearing elements 320. However, other sequential arrangements could also be employed within the scope of the present invention. For instance, the transverse elements could be arranged as a series of pairs of load bearing elements each followed by a single non-load bearing element. The choice of the sequential arrangement is dictated by, among other things, the amount of force expected to be applied by the sprocket teeth.

Referring again to FIG. 1, as a portion of the chain 20 circles a sprocket 30, 32, the bottom 140 of each transverse element, on the radial inside, traverses a smaller arc than the top 142 of each transverse element, on the radial outside. As a result, the transverse elements tend to tilt relative to each other, with the tops of the transverse elements farther apart than the bottoms of the transverse elements. To facilitate this tilting and to minimize stress on the principal faces resulting from this tilting, the bottom portions of the transverse elements may be tapered, having a smaller thickness than the top portions.

As can be seen from FIGS. 2 and 3, the thickness of the transverse elements may vary from the top of the element to the bottom of the element, providing a vertical/radial taper. For instance, the toe 112 of the load bearing elements 110 may be thinner than the body 114 of the element. Furthermore, the taper of any one transverse element may differ from the taper of other elements. For instance, two load bearing elements may be arranged adjacent to each other, each element having one straight principal face and one principal face having a vertical taper. Furthermore, the front of the first element may be tapered and the back of the second element may be tapered. In this way, the toes of the two load bearing elements together approximate the shape of a single tooth having tapered sides. Similarly, the transverse elements of the embodiment of the present invention shown in FIGS. 7–12 could also be provided with a vertical taper.

Although the embodiment of the present invention shown in FIGS. 4 and 5 is a head-pillar-body configuration, other transverse element designs are well known in the art and may be employed within the scope of the present invention. For instance, as shown in FIG. 13, a transverse element may comprise a head portion and a body portion connected on one lateral side by a pillar portion, thus forming a single recess for receiving a single carrier. Alternatively, as shown in FIG. 12, the transverse element may comprise a lower body portion and a pair of upward extending flanges, so that the carrier band is seated above the body portion and between the flanges. Transverse elements such as those shown in FIGS. 12 and 13 could be adapted to include lower depending toes or lateral flanges, such as the elements shown in FIGS. 4 and 9, or to otherwise include features allowing the elements to transmit power with a toothed sprocket within the scope of the present invention.

The transverse elements 110, 120 may also be configured to facilitate alignment of each transverse element with the adjacent transverse elements in the chain. As shown in FIG. 6, one means of facilitating this alignment is by providing some sort of interlocking fit between the front principal face 424 of a first transverse element 420 and the back principal face 412 of a second transverse element 410 positioned adjacent to the first element 420. For instance, as shown in FIGS. 4–6, each element may have a bulge 430 formed by a series of bends or bevels 432 in the element. Along the longitudinal axis, the bulge 430 protrudes in one direction and provides a recess in the opposite direction. Thus, the bulge 430 in one transverse element is received in the recess 434 of an adjacent element, forming an interlocking fit which facilitates alignment of the transverse elements. Transverse element designs having this type of coupling between adjacent elements are well known in the field of CVT belts.

Those skilled in the art to which the invention pertains may make modifications and other embodiments employing the principles of this invention without departing from its spirit or essential characteristics particularly upon considering the foregoing teachings. The described embodiments are to be considered in all respects only as illustrative and not restrictive and the scope of the invention is, therefore, indicated by the appended claims rather than by the foregoing description Consequently, while the invention has been described with reference to particular embodiments, modifications of structure, sequence, materials and the like would be apparent to those skilled in the art, yet still fall within the scope of the invention.

What is claimed is:

1. A power transmission system, comprising:

a plurality of rotating members, said rotating members having teeth formed about their outer periphery;

an endless chain wrapped around said rotating members;

said chain including a plurality of endless carrier bands extending the entire length of said chain and a plurality of transverse elements arranged longitudinally along said endless carrier bands, each of said transverse elements having at least one recess formed therein, said endless carrier bands being received in corresponding recesses in said transverse elements;

a first number of said plurality of transverse elements having a first profile and a second number of said plurality of transverse elements having a second profile; and said transverse elements having said first profile configured and positioned to engage said teeth of said rotating members and thereby transmit power therebetween, and the second number of traverse elements having said second profile being configured and positioned above the outer periphery of the said teeth.

2. The power transmission system of claim 1, wherein:

said transverse elements each have a height measured between the lowest point of said recess and the lowest point of said element; and said transverse elements of said first profile have a height greater than the height of said transverse elements having said second profile.

3. The power transmission system of claim 2, wherein said first profile includes a tooth portion positioned on the bottom of said transverse elements of said first profile, and said tooth portion having a length equal to the difference in height between said transverse elements of said first profile and said transverse elements of said second profile.

4. The power transmission system of claim 3, wherein said tooth portion is positioned and configured to contact said rotating member and to provide power transmission therewith.

5. The power transmission system of claim 1, wherein said rotating members are toothed sprockets.

6. The power transmission system of claim 5, wherein:

said first profile includes a tooth portion positioned on the bottom of said transverse elements of said first profile, said tooth portion having a length equal to the difference in height between said transverse elements of said first profile and said transverse elements of said second profile; and said tooth portion is positioned and configured to engage the teeth of said sprockets and to provide power transmission therewith.

7. The power transmission system of claim 1, wherein said transverse elements each have a width measured laterally between the outer edges of said elements, said transverse elements of said first profile having a width that is different than the width of said transverse elements of said second profile.

8. The power transmission system of claim 7, wherein said transverse elements of said first profile have a pair of flank portions on the lateral outsides of the elements.

9. The power transmission system of claim 8, each said flank portion configured and positioned to contact said rotating member and to provide power transmission therewith.

10. The power transmission system of claim 7, wherein said rotating members are toothed sprockets.

11. The power transmission system of claim 10, wherein said transverse elements of said first profile each have a pair of flank portions on the lateral outsides of said transverse element, said flank portions configured and positioned to engage the teeth of said sprockets and to provide power transmission therewith.

12. The power transmission system of claim 10, said sprocket teeth each having a pair of radial flanges forming a central groove, said groove having a width less than the width of said transverse elements of said first profile but greater than the width of said transverse elements of said second profile.

13. The power transmission system of claim 1, wherein each said transverse element includes a head portion and a body portion connected to said head portion by a pillar portion such that at least one recess is formed by said head, pillar, and body portion, each said carrier being received in a said recess.

14. The power transmission system of claim 1, wherein said transverse elements of said first profile are arranged sequentially in groups of at least two transverse elements.

15. The power transmission system of claim 1, wherein said transverse elements of said second profile are arranged sequentially in groups of at least two transverse elements.

16. The power transmission system of claim 1, said transverse elements each having a thickness measured in the direction of chain travel, said thickness being tapered in the vertical direction.

17. The power transmission system of claim 6, said tooth portions having a plurality of contact surfaces positioned to contact said sprocket teeth, said contact surfaces being straight.

18. The power transmission system of claim 6, said tooth portions having a plurality of contact surfaces positioned to contact said sprocket teeth, said contact surfaces being curved.

19. The power transmission system of claim 1, each said transverse element having a pair of principal faces, said first principal face having a projection in the longitudinal direction, and said second principal face having a recess whose shape corresponds to the projection in the first principal face.

20. The power transmission system of claim 1, wherein the ratio of the outer diameter of a first said rotating member to the outer diameter of a second said rotating member is constant during operation.

* * * * *